Nov. 1, 1932.          G. WOLF          1,885,881
SAFETY FRAME FOR AIRPLANES
Filed Nov. 19, 1931
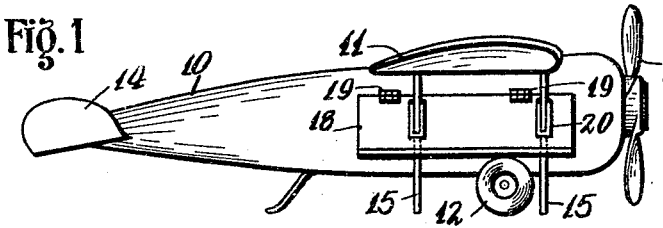
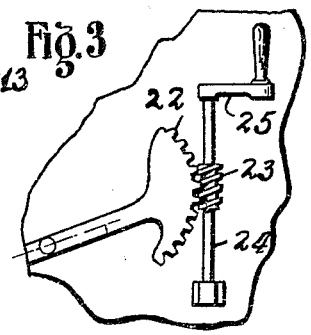
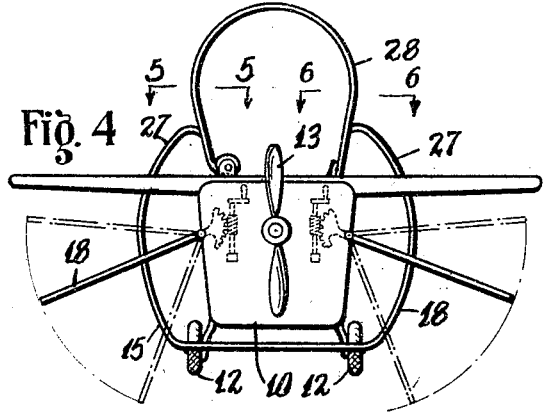
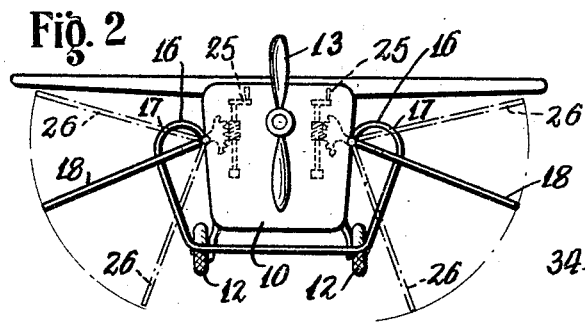
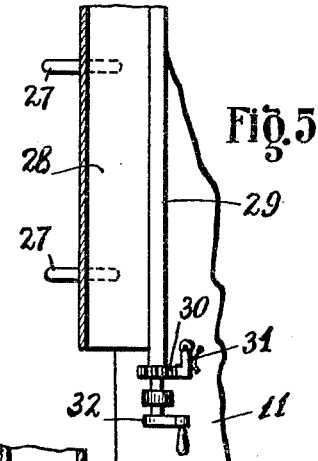
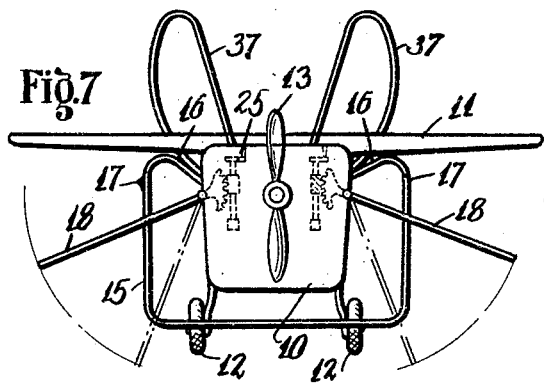
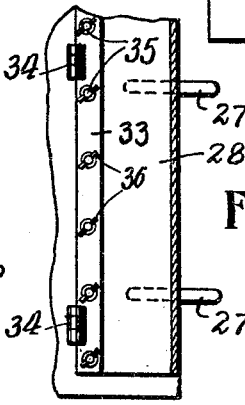
INVENTOR
Gabriel Wolf
BY Zoltan Holachek
ATTORNEY Patented Nov. 1, 1932

1,885,881

UNITED STATES PATENT OFFICE

GABRIEL WOLF, OF BRATISLAVA, CZECHOSLOVAKIA

SAFETY FRAME FOR AIRPLANES

Application filed November 19, 1931. Serial No. 576,093.

This invention relates to new and useful improvements in safety frame for airplanes.

The invention has for an object the construction of a safety frame for an airplane which is characterized by frame sections mounted upon the fuselage and adapted to protect the fuselage in the event of accident.

A still further object of this invention is to provide in conjunction with frame, pivotally mounted wings and means for adjusting these wings to various inclinations to act as stops to prevent the airplane from hitting on one side or on the other during a bad landing.

A still further object of this invention is the provision of top extensions upon the frame sections co-actable with a canvas sail constituting a parachute for further adding to the safety of the plane.

A still further object of this invention is the provision of auxiliary frame in conjunction with the frames previously mentioned and projecting above the wings of the airplane so as to provide protection at the top.

This invention has for a still further object the construction of a safety frame for airplanes which is of simple, durable construction, dependable in use and efficient in action, and which can be manufactured and sold at a reasonable cost.

For further comprehension of the invention, and of the object and advantages thereof, reference will be had to the following description and to the appended claims in which the various novel features of the invention are more particularly set forth.

In the accompanying drawing forming a material part of this disclosure:—

Fig. 1 is a side elevational view of an airplane constructed according to this invention.

Fig. 2 is a front elevational view of Fig. 1.

Fig. 3 is a fragmentary enlarged detailed view of a portion of Fig. 2 showing particularly a part of the inside construction.

Fig. 4 is a view similar to Fig. 2 but illustrating a modification of the invention.

Fig. 5 is a sectional view taken on the line 5—5 of Fig. 4.

Fig. 6 is a fragmentary sectional view taken on the line 6—6 of Fig. 4.

Fig. 7 is another view similar to Fig. 2 but illustrating a still further modification.

The device, according to this invention is used in combination with the fuselage 10 of an airplane having wings 11, a landing gear 12, a motor driven propeller 13, and tail controls 14. The frame comprises transverse frame sections 15 spaced from each other. Each of these frame sections 15 is of substantially U-shape form and extended around the fuselage 10. The ends 16 of these frame sections are attached upon the sides of the fuselage and the sections extend around underneath the fuselage. Portions of the frame sections are curved, particularly indicated by reference numerals 17.

Flap wings 18 are used in conjunction with the transverse frame sections, and more particularly, one wing on each side of the fuselage. Each of these wings are hingedly mounted at 19 upon the sides of the fuselage and extends outwards and are of length so as to be capable of having their outer edges extend below the landing gear 12 when the wings are lowered. Slots 20 in the wings provide for the passage of the frame sections 15. An arm 21 extends inwards from each of the wings and terminates in an arcuate rack 22. A worm 23 meshes with the teeth of this rack and is fixed upon the shaft 24 rotatively supported. A handle 25 upon the shaft allows for manual rotation thereof. Dot and dash lines 26 indicate adjusted positions of the wings.

In the form of the invention illustrated in Figs. 4, 5, and 6, the transverse frame sections are shown with portions 27 extended above the wings 11 of the airplane. These sections then head downwards and are attached upon the top corner of the fuselage. They provide side supports for a canvas sail 28. Normally, the sail 28 is wound upon a roller 29 arranged along one side of the fuselage. A gear 30 is fixed upon this roller and a spring pressed pawl 31 engages the gear and normally holds the roller against free turning. A handle 32 is also fixed upon the roller for manual turning of the roller when the latter element is free. A clamp 33 is mounted upon the other side of the fuselage for the purpose of clamping down the free end of the canvas sail 26. This is accomplished by a rod hingedly mounted at 34 upon the fuselage and formed with a plurality of apertures through which screws 35 may engage. These screws also pass through apertures in the end of the sail 28. Wing nuts 36 rotatively engage on the screws for holding the rod clamped down.

Normally, the canvas sail 28 is wound upon the roller. In case that trouble is sensed ahead the parachute sail 28 can be extended into loop form, as shown in Fig. 4, so as to help support the plane. When its use is no longer required, the screws 35 are loosened and the roller 29 wound by the handle 32 so as to wind the parachute sail back on the roller.

In Fig. 7 another modification of the invention has been disclosed in which auxiliary frame sections 37 extend from the fuselage of the plane up through the main wings 11. These auxiliary frames are substantially of inverted U-shape. They serve to protect the top of the fuselage in various cases, as for example, when the airplane has a spill on to its back. In this manner, persons within the fuselage can be spared. The other parts of the device are similar to corresponding parts illustrated previously and may be recognized by corresponding reference numerals.

While I have described my invention with some degree of particularity, I realize that in practice various alterations therein may be made. I therefore reserve the right and privilege of changing the form of the details or otherwise altering the arrangement of the correlated parts without departing from the spirit or the scope of the appended claims.

Having thus described my invention, what I claim as new, and desire to secure by United States Letters Patent is:—

1. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, and means for adjusting the angular positions of said wings.

2. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, and means for adjusting the angular positions of said wings, said transverse frame sections, comprising sails attached at their ends upon the sides of the fuselage and bent across the bottom of the fuselage.

3. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, and means for adjusting the angular positions of said wings, said wings extending along the sides of the fuselage so as to embrace all of the transverse frame sections.

4. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, and means for adjusting the angular positions of said wings, comprising arms projecting from said wings and terminating in arcuate racks, worms meshing with said racks, and means for adjusting the positions of the racks by turning the worms.

5. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, means for adjusting the angular positions of said wings, said frame sections extending through the wings of the airplane to the top and bent downwards against the top of the fuselage.

6. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, means for adjusting the angular positions of said wings, said frame sections extending through the wings of the airplane to the top and bent downwards against the top of the fuselage, and a parachute sail mounted on the top of the fuselage by the said frame sections.

7. In combination with the fuselage of an airplane having a landing gear, transverse frame sections spaced from each other and each extending from one side to the other side of the fuselage around the bottom, wings hinged on the sides of the fuselage and having slots through which the transverse frame sections pass and of lengths capable of being pivoted downwards so that their free edges engage against the ground, means for adjusting the angular positions of said wings, said frame sections extending through the wings of the airplane to the top and bent downwards against the top of the fuselage, and a parachute sail mounted on the top of the fuselage by the said frame sections, comprising a roller supporting a parachute sail, means for latching said roller in various positions, and means for holding the free end of said parachute sail.

In testimony whereof I have affixed my signature.

GABRIEL WOLF.